Figure 1:
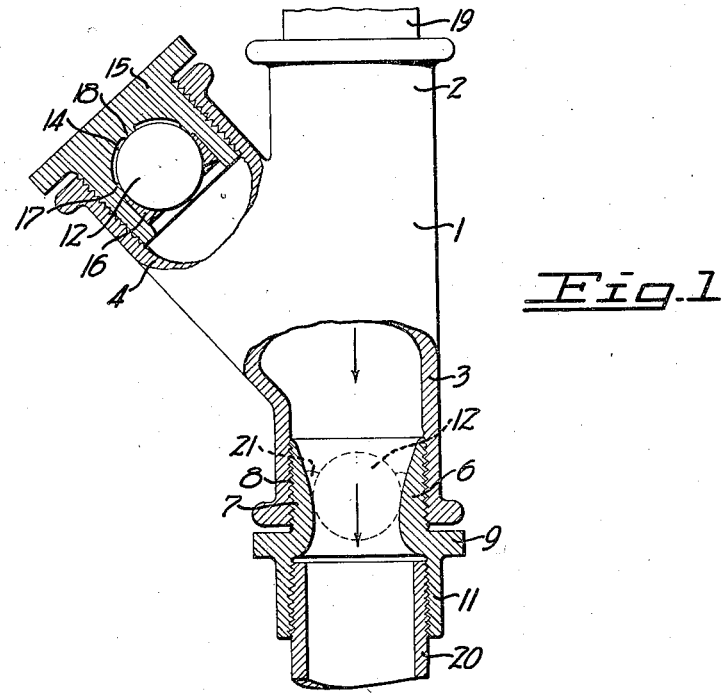

Aug. 30, 1938.                T. A. FINN                2,128,292
            SAFETY DEVICE FOR FUEL CONDUITS
                    Filed Nov. 23, 1936

INVENTOR
THOMAS A. FINN
BY Charles S. Evans
HIS ATTORNEY

Patented Aug. 30, 1938

2,128,292

UNITED STATES PATENT OFFICE 2,128,292

SAFETY DEVICE FOR FUEL CONDUITS

Thomas A. Finn, Daly City, Calif.

Application November 23, 1936, Serial No. 112,371

2 Claims. (Cl. 137—162)

My invention relates to improvements in a safety device for fuel conduits, and particularly to a device for automatically shutting off the supply of fuel through a conduit in event of a fire in the vicinity of the conduit.

It is among the objects of my invention to provide a device which may be readily mounted in connection with a fuel supply conduit without interfering with the normal supply of fuel therethrough, and which will automatically close the conduit when the surrounding temperature rises above a predetermined degree.

Another object of my invention is to provide a safety device embodying improved features of structure and arrangement obtaining simplicity, economy, and efficiency in manufacture and use.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Figure 2:
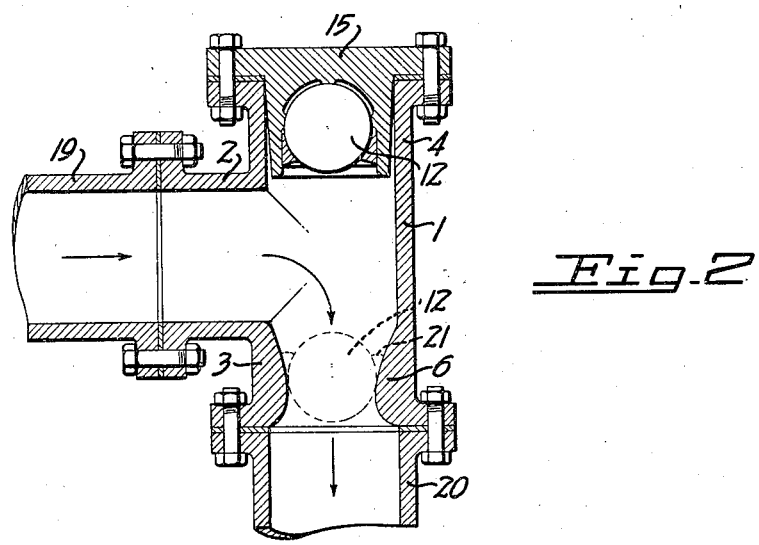

Referring to the drawing:

Figure 1 is a side elevation of a fitting embodying my invention, parts being broken away and shown in section; and Figure 2 is a vertical mid-sectional view of a modified form of the device of my invention.

In terms of broad inclusion, the safety device of my invention comprises a fitting arranged to connect adjacent sections of a conduit for fuel or other inflammable fluids, the fitting being provided with a valve member normally held in an inoperative position and arranged to be automatically released for movement to an operative position for shutting off the supply of fluid in case the surrounding temperature rises above a predetermined degree.

In terms of greater detail, the device of my invention comprises a fitting designated in general by the numeral 1. The fitting 1 is in the nature of a Y or T pipe fitting provided with an inlet arm 2, an outlet arm 3, and a branch arm 4 opening into the fitting between the inlet and outlet thereof.

The outlet arm 3 is provided with a throat portion 6 forming a valve seat. In the embodiment illustrated in Figure 1, the throat portion 6 is formed within the inner end of a sleeve 7 mounted in connection with the outlet arm 3 of the fitting, as for example by means of threads 8 engaging the internal threading of a standard pipe fitting. The sleeve 7 is preferably provided with an annular flange 9 shaped to receive a wrench for tightening the sleeve into the end of the arm 3, and an enlarged outer portion 11 internally threaded to receive the end of a section of conduit. The throat 6 is preferably shaped to approximate a venturi so as to permit an efficient flow of fluid therethrough, but the throat may be otherwise shaped so long as it affords an effective seat for a valve closure member. If desired, the throat 6 may be formed in the body of the fitting 1, as shown, for example, in Figure 2 of the drawing.

The branch arm 4 is provided with a valve member 12 normally held within the branch arm, and arranged to engage the throat 6 and prevent the passage of fluid therethrough when the member 12 is released from the branch arm 4. Preferably, the valve member 12 is of spherical shape, a polished steel ball being particularly suitable.

In my preferred practice, the ball is mounted within a recess 14 formed in the inner end of a plug 15 mounted in the outer end of the branch arm 4. The ball 12 is normally held seated in the recess 14 by means of a fillet 16 of fusible material having a low fusion point such that an abnormal rise in the surrounding temperature will cause the fillet to fuse and release the ball for movement by gravity into engagement with the throat or valve seat 6. The fillet 16 is preferably formed of a low melting point solder. Beeswax, paraffine, resin, and other similar substances may be used if desired, care being taken to select a substance which is not materially affected by the fluid passing through the conduit.

The plug 15 may be threaded into the end of the branch arm 4, or it may be secured thereon in any other convenient manner. The plug may advantageously be made of copper or other metal of high heat conductivity so that heat from the surrounding atmosphere will be rapidly conducted to the fillet 16 in event an abnormal rise in temperature should occur. Preferably the ball 12 is seated upon a bead 17 arranged to hold the inner portion of the ball out of contact with the surrounding wall, and to prevent penetration of the fillet material 16 materially past the center of the ball 12. A projection 18 may advantageously be provided at the back of the recess 14 to further insure against retention of the ball in the recess after the fillet is fused, the space between the ball and the back of the recess serving to effectually prevent the ball from being held in the recess by suction, cohesion, or frictional resistance to movement.

In operation, the fitting 1 is connected between adjacent sections 19 and 20 of a conduit for conducting fuel or other inflammable fluid. The fitting 1 may be mounted at any convenient point, or fittings may be placed at a number of points along a supply line where it may be desirable to close off the supply of fluid flowing through the conduit in event of fire. For example, a fitting may be mounted at a point near the point of delivery of liquid or gaseous fuel to a furnace, or near the entrance of a fuel supply conduit into a building, or into a particular room of a building, or at several of such points wherever the presence of a fire hazard indicates the advisability of installing such fitting.

The fitting, or fittings, are connected into the fuel supply conduit in such manner that the branch arm 4 is positioned above the outlet end of the fitting so that the ball 12 may drop by gravity into engagement with the throat or seat 6. In the case of a Y shaped fitting such as illustrated in Figure 1 of the drawing, the body of the fitting 1 is preferably mounted in substantially vertical position with the branch arm 4 opening downwardly into the body of the fitting. In a T shaped fitting such as illustrated in Figure 2, the inlet should be through the side, and the outlet at the bottom of the fitting, the plug 15 and valve member 12 being mounted in the branch arm above the outlet so that the valve member may drop by gravity into engagement with the seat 6.

Under normal conditions, the valve member 12 will be held in an inoperative position by the fillet 16, as shown in full lines in Figures 1 and 2, so as to permit the flow of fuel through the supply conduit along the course indicated by the arrows. In event a fire occurs in the vicinity of the fitting 1, the resulting rise in temperature around the fitting will cause the fillet 16 to be fused. As the fillet 16 is fused, the valve member 12 will drop by gravity and rest upon the seat 6 as indicated in dotted lines in Figures 1 and 2, thereby effectually closing the conduit and preventing the further delivery of fuel therethrough such as might otherwise feed and maintain the fire and render it more difficult to control.

By an appropriate selection of the fusible material used in making the fillet 16, the device may be made to operate automatically in response to an abnormal rise in temperature of any desired degree. For example, the fusing point of soldering alloys vary through a wide range depending upon the composition of the alloy. The properties of the various soldering alloys are well known, and by selecting an alloy of desired fusing point, the temperature at which the valve member will be released may be accurately predetermined. The use of beeswax, or other similar substances increases the range of temperature at which the device may be designed to operate.

The fitting of my invention is especially useful in connection with the fuel supply conduits to industrial and household furnace installations. It is also useful in connection with the fuel supply conduits for ships, airplanes, and motor vehicles, and in other similar environments. In all cases, the fitting should be installed at points where the fire hazard is a maximum so that in event fire occurs, the supply of fuel or inflammable fluid flowing therepast will be automatically shut off as a result of the first rise in temperature.

The manner of connecting the fitting 1 to adjacent sections of conduit will of course depend upon the size and nature of the conduit. For ordinary household and industrial installations, the fitting 1 may be a standard pipe fitting equipped with a sleeve 7 and plug 15 such as illustrated in Figure 1. For larger conduits, a flanged fitting such as shown in Figure 2 may be used. In other installations, the fitting will of course be modified to suit the character of the conduit.

It is desirable, but not essential, that the valve member 12 and seat 6 be machined to insure an accurate fit. In most installations ordinary imperfections in the finishing of the valve member and seat are not particularly objectionable since the valve member will substantially shut off the supply of fuel and prevent the escape of a jet of fuel under the pressure, and a slight leakage of fuel may be readily controlled. Moreover, when the fillet 16 is formed of solder, the ball 12 drops into engagement with the seat 6 in advance of the fused solder. As a result, the melted solder collects in a pool around the sides of the ball as indicated in dotted lines at 21 and completely seals the outlet. After the fitting cools, the solder will again set and hold the ball 12 in outlet sealing position. When the emergency has passed, the fitting may be removed, the ball displaced and reset in the plug 15, and the fitting reinstalled. Particles of solder adhering to the seat 6 after the ball 12 is displaced therefrom should be removed before the fitting is again used.

In addition to its utility in connection with fuel supply lines, the device is equally useful and operates in a similar manner in connection with conduits supplying inflammable, poisonous, or harmful fluids in other environments, as for example in cleaning establishments, refrigeration plants, poison gas manufacturing plants, and other establishments wherein the severance of a conduit by fire might result in the freeing of a supply of damaging fluids.

I claim:

1. A safety device for fuel supply conduits comprising a fitting having inlet and outlet ends and a branch opening into the fitting above the outlet, a valve seat in the outlet end of the fitting, a plug mounted in connection with the outer end of the branch and having a recess in its inner end, a ball seating in the recess, means upon the plug for holding the inner portion of the ball in spaced relation to the back of the recess, fusible means normally holding the ball in the recess for automatically releasing the ball for movement into engagement with the valve seat when the surrounding temperature exceeds a predetermined degree, and means for excluding the fusible material from the space between the ball and the back of the recess.

2. A safety device for fuel supply conduits comprising a fitting having inlet and outlet ends and a branch opening into the fitting above the outlet, a Venturi throat providing a valve seat in the outlet end of the fitting, a plug mounted in connection with the outer end of the branch and having a recess in its inner end, a bead providing an annular seat in the recess, a ball engaging the seat with the inner portion of the ball in spaced relation to the back of the recess, a fillet of fusible material positioned outwardly from the bead and normally holding the ball upon the bead, the fillet being excluded from the space back of the ball and being fusible when subjected to temperature exceeding a predetermined degree for automatically releasing the ball for movement into engagement with the valve seat.

THOMAS A. FINN.